United States Patent
Nishizaka et al.

(10) Patent No.: US 7,228,060 B2
(45) Date of Patent: Jun. 5, 2007

(54) COPY GUARD METHOD AND DIGITAL BROADCAST RECEIVING APPARATUS

(75) Inventors: Junya Nishizaka, Saijo (JP); Kunio Ninomiya, Niihama (JP); Koichi Komoda, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1233 days.

(21) Appl. No.: 09/980,312

(22) PCT Filed: Mar. 30, 2001

(86) PCT No.: PCT/JP01/02734

§ 371 (c)(1),
(2), (4) Date: Feb. 7, 2002

(87) PCT Pub. No.: WO01/74067

PCT Pub. Date: Oct. 4, 2001

(65) Prior Publication Data

US 2002/0136527 A1 Sep. 26, 2002

(30) Foreign Application Priority Data

Mar. 30, 2000 (JP) .............................. 2000-95069

(51) Int. Cl.
*H04N 5/91* (2006.01)
*G11B 15/04* (2006.01)

(52) U.S. Cl. ........................... 386/94; 360/60; 380/203

(58) Field of Classification Search .................... 386/1, 386/12, 37, 46, 68, 94, 95, 111, 112; 348/473–476; 360/60

See application file for complete search history.

(56) References Cited

U.S. PATENT DOCUMENTS

| | | | | |
|---|---|---|---|---|
| 5,510,900 A | * | 4/1996 | Shirochi et al. | 386/94 |
| 5,579,120 A | * | 11/1996 | Oguro | 386/94 |
| 5,940,134 A | * | 8/1999 | Wirtz | 348/473 |
| 6,018,608 A | * | 1/2000 | Sakashita et al. | 386/1 |
| 6,212,325 B1 | * | 4/2001 | Kori | 386/1 |
| 6,587,638 B1 | * | 7/2003 | Watanabe et al. | 386/94 |

FOREIGN PATENT DOCUMENTS

| | | |
|---|---|---|
| CN | 1275032 | 11/2000 |
| EP | 1052852 | 11/2000 |
| JP | 4-368085 | 12/1992 |
| JP | 10-200920 | 7/1998 |
| JP | 10-224818 | 8/1998 |
| JP | 11-27695 | 1/1999 |
| JP | 11-32293 | 2/1999 |
| JP | 2000-324469 | 11/2000 |
| JP | 2001-69136 | 3/2001 |

* cited by examiner

*Primary Examiner*—Thai Q. Tran
*Assistant Examiner*—Mishawn Dunn
(74) *Attorney, Agent, or Firm*—Wenderoth, Lind & Ponack, L.L.P.

(57) ABSTRACT

According to a copy protection method of the present invention, as for a component video signal which is composed of a luminance signal and two color-difference signals, copy inhibition information is superimposed upon a first color-difference signal and information indicating that the copy inhibition information is included in the first color-difference signal is superimposed upon a second color-difference signal. Or copy inhibition information is superimposed upon the luminance signal, a vertical blanking interval, or a horizontal blanking interval.

Accordingly, it can be judged whether or not the video is capable of copying, without making the viewers conscious, whereby component video signals can be easily copy protected.

16 Claims, 12 Drawing Sheets

COPY GUARD METHOD AND DIGITAL BROADCAST RECEIVING APPARATUS

TECHNICAL FIELD

The present invention relates to a method for protecting video data against copying when video data including copy inhibition information is outputted as a video signal which is composed of a luminance signal and two color-difference signals, and a digital broadcast receiver for outputting a video signal to which this copy protection method has been carried out.

BACKGROUND ART

As VCRs (Video Cassette Recorders) have been coming into wide use, it has become possible to easily view video data of recorded television broadcast or contents of software which can be reproduced by the VCR. In addition, recently, digital VCRs and recording/reproduction apparatus for DVDs (Digital Video Discs) have been progressed, whereby high-quality video data can be recorded and reproduced. Since the high-quality video data can be easily recorded/reproduced because of the recent progress in the VCRs and the DVD recording/reproduction apparatus, the security of copyrights on video data which are recorded on the digital VCRs or DVDs has become important. Therefore, various methods for preventing unauthorized copying have been conventionally carried out.

For example as for analog video signals, there is a method by which copying is protected with utilizing a difference in AGC (Auto Gain Control) methods between the VCR and the TV, or a difference in characteristics of APC (Auto Phase Control).

However, in the conventional copy protection method, only a carrier signal which is obtained by modulation of a color signal can be protected against copying, while a color-difference signal which is not modulated cannot be protected against copying. More specifically, for a color-difference signal which is not modulated as shown in FIG. 15 or a component video signal which is composed of primary-color signals, there is no suitable copy protection method and thus these signals can be easily copied.

The present invention is made in view of the above-mentioned problems and has for its object to provide a copy protection method for a component signal which is composed of a luminance signal and color-difference signals, and a digital broadcast receiver for outputting the copy-protected component signal.

DISCLOSURE OF THE INVENTION

According to a first aspect of the present invention, there is provided a copy protection method for a component video signal which is composed of a luminance signal and two color-difference signals, comprising steps of: on a digital broadcast receiver side, superimposing copy inhibition information upon a first one of the two color-difference signals and superimposing, upon a second one of the color-difference signals, a copy inhibition information superimposition indication signal indicating that the copy inhibition information is superimposed upon the first color-difference signal; and on a recorder side, when the copy inhibition information superimposition indication signal is detected in the second color-difference signal, analyzing the first color-difference signal and, when the copy inhibition information is detected in the first color-difference signal, carrying out a copy inhibition process without performing recording.

Therefore, the component video signal which is composed of a luminance signal and two color-difference signals can be protected against unauthorized copying.

According to a second aspect of the present invention, there is provided a digital broadcast receiver comprising: a copy guard detection unit for detecting whether input video data is copy inhibited or not; and an information addition unit for superimposing copy inhibition information upon a first one of two color-difference signals when the copy guard detection unit detects that the input video data is copy inhibited and superimposing, upon a second one of the color-difference signals, a copy inhibition information superimposition indication signal indicating that the copy inhibition information is superimposed upon the first color-difference signal.

Therefore, there can be provided a digital broadcast receiver which, when copy-inhibited video data is received, outputs a component signal including two color-difference signals subjected to copy protection of superimposing copy inhibition information upon the first color-difference signal and superimposing a copy inhibition information indication signal indicating that the copy inhibition information is superimposed upon the first color-difference signal, upon the second color-difference signal.

According to third aspect of the present invention, in the copy protection method of the first aspect, the copy inhibition information is superimposed upon the first color-difference signal and the copy inhibition information superimposition indication signal is superimposed upon the second color-difference signal in field units or in line units.

Therefore, the copy inhibition information can be efficiently superimposed upon the color-difference signal of the component signal.

According to a fourth aspect of the present invention, in the digital broadcast receiver of the second aspect, when the copy inhibition information is superimposed upon the first color-difference signal and the copy inhibition information superimposition indication signal is superimposed upon the second color-difference signal, the information addition unit performs the superimposition in field units or in line units.

Therefore, there can be provided a digital broadcast receiver which can outputs a component signal including a color-difference signal subjected to copy protection in field units or in line units.

According to a fifth aspect of the present invention, in the copy protection method of the first aspect, after the copy inhibition information is superimposed upon the first color-difference signal and the copy inhibition information superimposition indication signal is superimposed upon the second color-difference signal, in field units, the superimposed color-difference signal of each field and a color-difference signal of an immediately preceding field are composed.

Therefore, disturbances in video can be reduced when the component signal which has been subjected to copy protection in field units is displayed on the TV side, and it is possible to prevent the viewers from recognizing that the copy inhibition information is superimposed upon the color-difference signal.

According to a sixth aspect of the present invention, the digital broadcast receiver of the second aspect comprises: a color-difference signal composition unit for, after the copy inhibition information is superimposed upon the first color-difference signal and the copy inhibition information superimposition indication signal is superimposed upon the second color-difference signal, in field units, composing the superimposed color-difference signal of a field and a color-difference signal of an immediately preceding field.

Therefore, there can be provided a digital broadcast receiver which can reduce disturbances in video when the component signal which has been subjected to copy protection in field units is displayed on the TV side, and can output a video signal for which the viewers do not recognize that the copy inhibition information is superimposed upon the color-difference signal in field units.

According to a seventh aspect of the present invention, in the copy protection method of the first aspect, after the copy inhibition information is superimposed upon the first color-difference signal and the copy inhibition information superimposition indication signal is superimposed upon the second color-difference signal, in line units, the superimposed color-difference signal of each line and a color-difference signal of an immediately preceding line are composed.

Therefore, disturbances in video can be reduced when the component signal which has been subjected to copy protection in line units is displayed on the TV side, and it is possible to prevent the viewers from recognizing that copy inhibition information is superimposed upon the color-difference signal in line units.

According to an eighth aspect of the present invention, the digital broadcast receiver of the second aspect comprises: a color-difference signal composition unit for, after the copy inhibition information is superimposed upon the first color-difference signal in line units and the copy inhibition information superimposition indication signal is superimposed upon the second color-difference signal, composing the superimposed color-difference signal of a line and a color-difference signal of an immediately preceding line.

Therefore, there can be provided a digital broadcast receiver which can reduced disturbances in video when the component signal subjected to copy protection in line units is displayed on the TV side, and can output a video signal for which the viewers do not recognize that the copy inhibition information is superimposed upon the color-difference signal in line units.

According to a ninth aspect of the present invention, in the copy protection method of any of the first, third, fifth and seventh aspect, when the copy inhibition information is superimposed upon the first color-difference signal and the copy inhibition information superimposition indication signal is superimposed upon the second color-difference signal, they are superimposed at irregular intervals.

Therefore, when the component signal which has been subjected to copy protection is displayed on the TV side, it is possible to prevent the viewers from recognizing that the copy inhibition information is superimposed.

According to a tenth aspect of the present invention, the digital broadcast receiver of any of the second, fourth, sixth and eighth aspects comprises: an additional signal control unit for, when the copy inhibition information is superimposed upon the first color-difference signal and the copy inhibition information superimposition indication signal is superimposed upon the second color-difference signal, performing control for superimposing the same at irregular intervals.

Therefore, there can be provided a digital broadcast receiver which can output a component signal that is not recognized by the viewers when the signal upon which copy inhibition information has been superimposed at irregular intervals and subjected to copy protection is displayed on the TV side.

According to an eleventh aspect of the present invention, there is provided a copy protection method for a component video signal which is composed of a luminance signal and two color-difference signals, comprising steps of: on a digital broadcast transmitting end, inverting a synchronizing signal included in the luminance signal; on a digital broadcast receiving end, when it is detected that the synchronizing signal is inverted, inverting the synchronizing signal again to obtain the original signal; and on a recorder end, when it is detected that the synchronizing signal is inverted, carrying out a copy inhibition process without performing recording.

Therefore, when the component signal which has been subjected to copy protection is outputted on the TV side, it is displayed on the screen as usual, while when the component signal is recorded on the recording end, the recording is not performed.

According to a twelfth aspect of the present invention, there is provided a digital broadcast receiver comprising: a copy guard detection unit for detecting whether input video data is copy inhibited or not; and a synchronizing signal inversion unit for, when the copy guard detection unit detects that the video data is copy inhibited, inverting a synchronizing signal included in a luminance signal which is to be outputted.

Therefore, there can be provided a digital broadcast receiver which can output a luminance signal subjected to copy protection of inverting a synchronizing signal, when copy-inhibited video is inputted.

According to a thirteenth aspect of the present invention, there is provided a copy protection method for a component video signal which is composed of a luminance signal and two color-difference signals, comprising steps of: inverting the luminance signal, and superimposing a luminance signal inversion indication signal indicating that the luminance signal is inverted, upon a vertical blanking interval of one or both of the color-difference signals; on a TV side, when the luminance signal inversion indication signal is detected in the vertical blanking interval of the color-difference signal, inverting the luminance signal again to obtain the original signal; and on a recorder side, when the luminance signal inversion indication signal is detected in the vertical blanking interval of the color-difference signal, deleting the luminance signal inversion indication signal and recording the inverted luminance signal as it is, or carrying out a copy inhibition process.

Therefore, the inverted luminance signal of the component signal which has been subjected to copy protection is recorded as it is, or the copy inhibition process is carried out when the inverted luminance signal is detected, thereby protecting the inputted video signal against unauthorized copying.

According to a fourteenth aspect of the prresent invention, there is provided a digital broadcast receiver comprising: a copy guard detection unit for detecting whether input video data is copy inhibited or not; a luminance signal inversion unit for inverting a luminance signal when the copy guard detection unit detects that the video data is copy inhibited; and an information addition unit for superimposing a luminance signal inversion indication signal indicating that the luminance signal is inverted, upon a vertical blanking interval of a color-difference signal.

Therefore, there can be provided a digital broadcast receiver which can output a component video signal subjected to copy protection of inverting the luminance signal as well as superimposing a luminance signal inversion indication signal indicating that the luminance signal is inverted, upon the vertical blanking interval of the color-difference signal, when copy-inhibited video data is inputted.

According to a fifteenth aspect of the present invention, there is provided a copy protection method for a component video signal which is composed of a luminance signal and two color-difference signals, comprising steps of: inverting the luminance signal, and superimposing a luminance signal inversion indication signal indicating that the luminance signal is inverted, upon a horizontal blanking interval of one or both of the color-difference signals; on a TV side, when the luminance signal inversion indication signal is detected in the horizontal blanking interval of the color-difference signal, inverting the luminance signal again to obtain the original signal; and on a recorder side, when the luminance signal inversion indication signal is detected in the horizontal blanking interval of the color-difference signal, deleting the luminance signal inversion indication signal and recording the inverted luminance signal as it is, or carrying out a copy inhibition process.

Therefore, the inverted luminance signal of the component signal which has been subjected to the copy protection is recorded as it is, or a copy inhibition process is carried out when the inverted luminance signal is detected, thereby protecting the inputted video signal from unauthorized copying.

According to a sixteenth aspect of the present invention, there is provided a digital broadcast receiver comprising: a copy guard detection unit for detecting whether input video data is copy inhibited or not; a luminance signal inversion unit for inverting a luminance signal when the copy guard detection unit detects that the video data is copy inhibited; and an information addition unit for superimposing a luminance signal inversion indication signal indicating that the luminance signal is inverted, upon a horizontal blanking interval of a color-difference signal.

Therefore, there can be provided a digital broadcast receiver which can output a component video signal subjected to copy protection of inverting a luminance signal and superimposing a luminance signal inversion indication signal indicating that the luminance signal is inverted, upon the horizontal blanking interval of the color-difference signal, when copy-inhibited video data is inputted.

According to a seventeenth aspect of the present invention, there is provided a copy protection method for a component video signal which is composed of a luminance signal and two color-difference signals, comprising steps of: superimposing copy inhibition video which interferes with video, upon a start part or an end part of a video effective period of a field, and delaying or advancing a start position of a normal video signal by the superimposed copy inhibition video; superimposing, upon a vertical blanking interval of the luminance signal or one or both of the color-difference signals, a copy inhibition video superimposition indication signal indicating that the copy inhibition video is superimposed upon the start part or the end part of the video effective period of the field; on a TV side, when the copy inhibition video superimposition indication signal is detected, deleting the copy inhibition video and returning the normal video signal to the video effective period of the field; and on a recorder side, when the copy inhibition video superimposition indication signal is detected, deleting the copy inhibition video superimposition indication signal and recording the video signal, so that when the video signal is reproduced, the copy inhibition video is displayed on an upper part or a lower part of a monitor screen and the normal video is not displayed.

Therefore, when a copy-inhibited input video signal is copied and displayed, the normal video is made not to be displayed, whereby the inputted video signal can be protected against unauthorized copying.

According to an eighteenth aspect of the present invention, there is provided a digital broadcast receiver comprising: a copy guard detection unit for detecting whether input video data is copy inhibited or not; a copy inhibition video insertion unit for, when the copy guard detection unit detects that the video data is copy inhibited, superimposing copy inhibition video which interferes with video, upon a start part or an end part of a video effective period of a field, and delaying or advancing a start position of a normal video signal by the superimposed copy inhibition video; and an information addition unit for superimposing, upon a vertical blanking interval of a luminance signal or one of both of color-difference signals, a copy inhibition video superimposition indication signal indicating that the copy inhibition video is superimposed upon the start part or the end part of the video effective period of the field.

Therefore, there can be provided a digital broadcast receiver which inserts copy inhibition video when it detects that an inputted video signal is copy inhibited, thereby protecting the inputted video signal against unauthorized copying.

According to a nineteenth aspect of the present invention, there is provided a copy protection method for a component video signal which is composed of a luminance signal and two color-difference signals, comprising steps of: superimposing copy inhibition video upon a start part or an end part of a video effective period of a line, and delaying or advancing a start position of a normal video signal by the superimposed copy inhibition video; superimposing, upon a vertical blanking interval of the luminance signal or one or both of the color-difference signals, a copy inhibition video superimposition indication signal indicating that the copy inhibition video is superimposed upon the start part or the end part of the video effective period of the line; on a TV side, when the copy inhibition video superimposition indication signal is detected, deleting the copy inhibition video and returning the original video signal to the video effective period of the line; and on a recorder side, when the copy inhibition video superimposition indication signal is detected, deleting the copy inhibition video superimposition indication signal and recording the video signal, so that when the video signal is reproduced, the copy inhibition video is displayed on a left part or a right part of a monitor screen and the normal video is not displayed.

Therefore, when the inputted copy-inhibited video is copied and displayed, the normal video is made not to be displayed, whereby the inputted video signal can be protected against unauthorized copying.

According to a twentieth aspect of the present invention, there is provided a digital broadcast receiver comprising: a copy guard detection unit for detecting whether input video data is copy inhibited or not; a copy inhibition video insertion unit for, when the copy guard detection unit detects that the input video data is copy inhibited, superimposing copy inhibition video which interferes with video, upon a start part or an end part of a video effective period of a line, and delaying or advancing a start position of a normal video signal by the superimposed copy inhibition video; and an information addition unit for superimposing the copy inhibition video superimposition indication signal upon a vertical blanking period of a luminance signal or one or both of color-difference signals.

Therefore, there can be provided a digital broadcast receiver which inserts copy inhibition video when it detects that an inputted video signal is copy inhibited, thereby protecting the copy-inhibited inputted video signal against unauthorized copying.

BEST MODE FOR CARRYING OUT THE INVENTION

Hereinafter, a copy protection method and a digital broadcast receiver according to embodiments of the present invention will be described with reference to figures. According to this invention, a video signal to be copy guarded and a video signal outputted by the digital broadcast receiver are so-called component video signals each being composed of one luminance signal and two color-difference signals, such as Y/U/V, Y/Pb/Pr, and Y/Cb/Cr. Hereinafter, one combination, i.e., either a combinations of color-difference signals U, Pb and Cb or a combination of color-difference signals V, Pr and Cr is referred to as a first color-difference signal, and the other is referred to as a second color-difference signal.

[Embodiment 1]

A copy protection method and a digital broadcast receiver according to a first embodiment of the present invention will be described with reference to FIGS. 1 and 2.

Initially, the copy protection method of the first embodiment is described with reference to FIG. 2.

Figure 2:
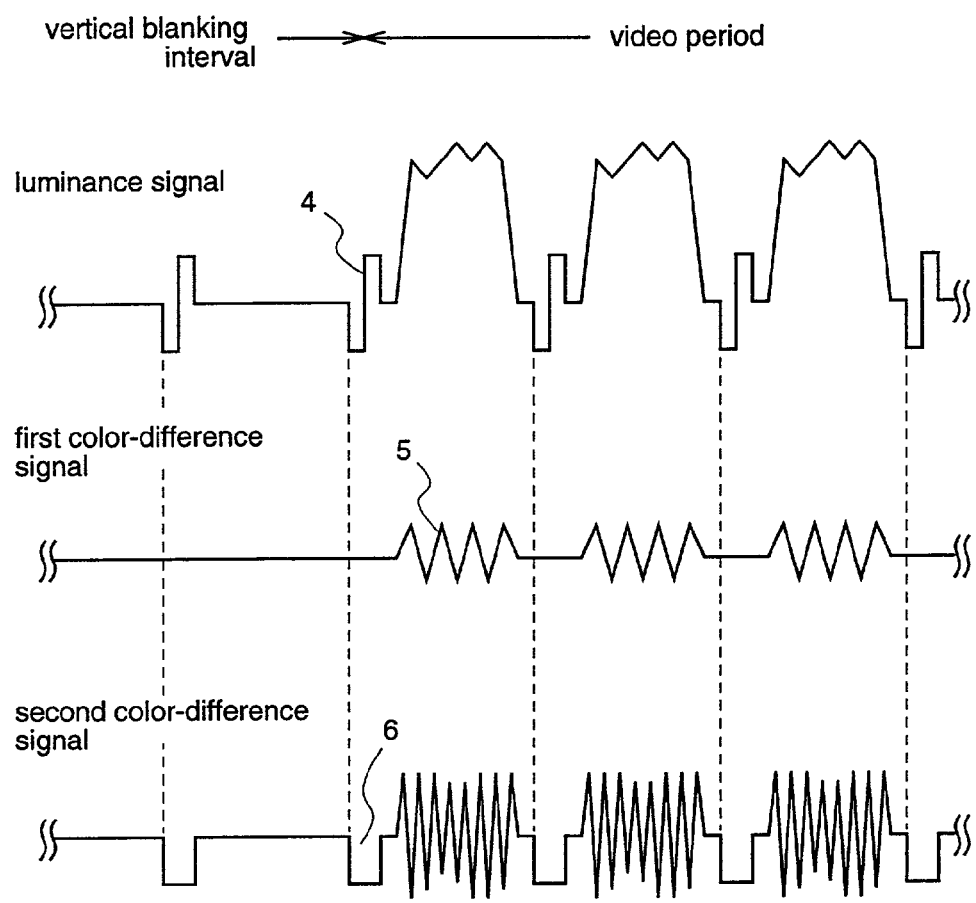
FIG. 2 is a waveform diagram showing a luminance signal and color-difference signals, which are copy protected according to the first embodiment.

FIG. 2 is a waveform diagram showing a luminance signal and color-difference signals which are copy protected in the first embodiment. In FIG. 2, reference numeral 4 denotes a synchronizing signal included in a luminance signal in a component video signal. Numeral 5 denotes copy inhibition information which is superimposed upon a first color-difference signal, with a normal video color-difference signal being removed from the first color-difference signal. Numeral 6 denotes a copy inhibition information superimposition indication signal, which is superimposed upon a horizontal blanking interval part of a second color-difference signal, indicating that copy inhibition information is superimposed upon the other color-difference signal, i.e., the first color-difference signal.

Figure 1:
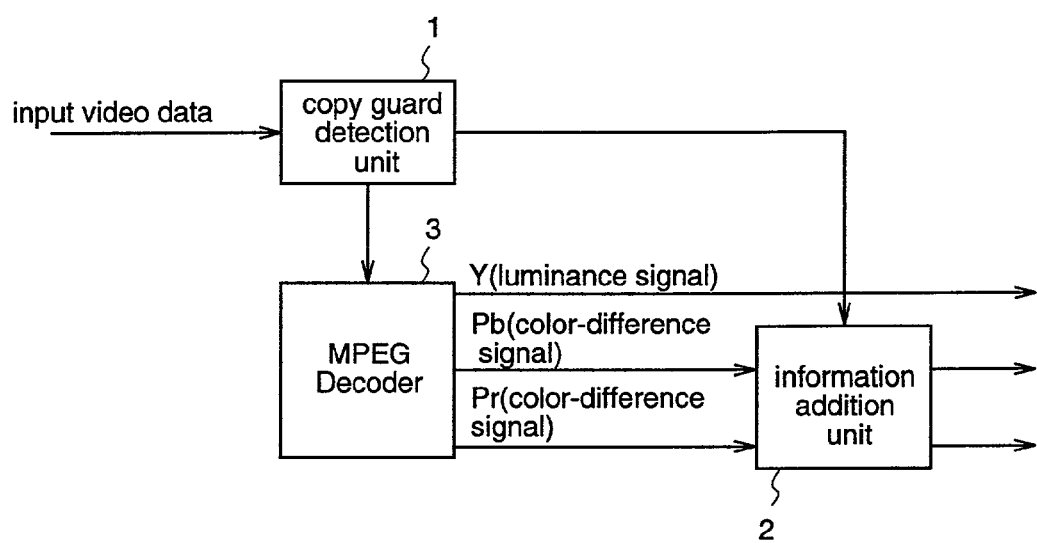
FIG. 1 is a diagram illustrating a structure of a digital broadcast receiver for outputting a copy-protected component video signal according to a first embodiment.

FIG. 1 is a block diagram illustrating a digital broadcast receiver according to the first embodiment.

In FIG. 1, reference numeral 1 denotes a copy guard detection unit for detecting copy-guarded information from input video data or system information which is transmitted together with video data. Numeral 2 denotes an information addition unit for copy protecting a component video signal to be outputted, when an inputted video signal is copy inhibited. Numeral 3 denotes an MPEG decoder for outputting the input video data from the copy guard detection unit 1 as a component signal which is composed of a luminance signal and two color-difference signals.

When the copy inhibition video data is outputted as a component video signal which is composed of a luminance signal and two color-difference signals, a color-difference signal of normal video is removed from the first color-difference signal and copy inhibition information 5 is superimposed thereon as shown in FIG. 2. Further, as for the second color-difference signal, a copy inhibition information superimposition indication signal 6 indicating that copy inhibition information is superimposed upon the first color-difference signal is inserted in the horizontal blanking interval, in synchronization with the synchronizing signal 4. Here, the copy inhibition information superimposition indication signal 6 is not restrictively superimposed upon the horizontal blanking interval but may be superimposed upon the vertical blanking interval or the video period not in synchronization with the synchronizing signal 4.

On the side of a recorder which records a component video signal, the color-difference signals of the inputted component video signal are monitored and, when the copy inhibition information superimposition indication signal 6 indicating that the copy inhibition information is superimposed upon the first color-difference signal is detected from the second color-difference signal, the first color-difference signal is analyzed. Then, when the information which is superimposed upon the first color-difference signal is the copy inhibition information 5, recording of the component video signal is not performed but the copy inhibition process is performed, thereby preventing unauthorized copying.

Even when this copy-protected component video signal is outputted on the TV side as it is, since the copy inhibition information 5 is superimposed only upon the color-difference signal, the viewers hardly recognize it.

Next, with reference to FIG. 1, the operation of the digital broadcast receiver for outputting a copy-protected video signal according to the first embodiment will be described.

As shown in FIG. 1, video data is initially inputted to the copy guard detection unit 1. Then, in the copy guard detection unit 1, it is judged whether the video data is copy inhibited or not, on the basis of the input video data or system information transmitted together with video data and the like. Next, the input video data is transferred to the MPEG decoder 3, and outputted as a component signal which is composed of a luminance signal, a first color-difference signal, and a second color-difference signal.

When the input video data is judged by the copy guard detection unit 1 that it is copy inhibited, the copy guard detection unit 1 outputs a signal for copy protection to the information addition unit 2. The information addition unit 2 which has received the signal superimposes the copy inhibition information 5 upon the first color-difference signal, and superimposes the copy inhibition information superimposition indication signal 6 indicating that the copy inhibition information 5 is superimposed upon the first color-difference signal, upon the second color-difference signal.

In the case where the copy inhibition information 5 is superimposed upon the first color-difference signal and further the copy inhibition information superimposition indication signal 6 is superimposed upon the second color-difference signal by the information addition unit 2, they can be superimposed in field units or line units. In addition, information other than the copy inhibition information can be superimposed upon the first color-difference signal, and a signal indicating that the information for the video signal is superimposed upon the first color-difference signal can be superimposed upon the other signal, i.e., the second color-difference signal.

For example, when information is superimposed upon the component video signal in field units, more information can be superimposed in the case where information other than the copy inhibition information is superimposed upon the color-difference signal. On the other hand, when information is superimposed in line units, it is possible to prevent the viewers from recognizing that the information is superimposed upon the color-difference signal when the video is outputted on the TV side.

As described above, according to the copy protection method and the digital broadcast receiver of this first embodiment, the copy inhibition information 5 is superimposed upon a color-difference signal of a component video signal, whereby the copy inhibition information can be added to the component video signal with the viewers hardly recognizing it even when the video signal is outputted on the screen. Further, the copy inhibition information superimposition indication signal 6 indicating that the copy inhibition information is superimposed upon one color-difference signal is superimposed upon the other color-difference signal, whereby the copy inhibition information 5 can be recognized accurately when the copy inhibition information is superimposed upon any of color-difference signals.

[Embodiment 2]

A copy protection method and a digital broadcast receiver according to a second embodiment of the present invention will be described with reference to FIGS. 3 and 4.

Figure 3:
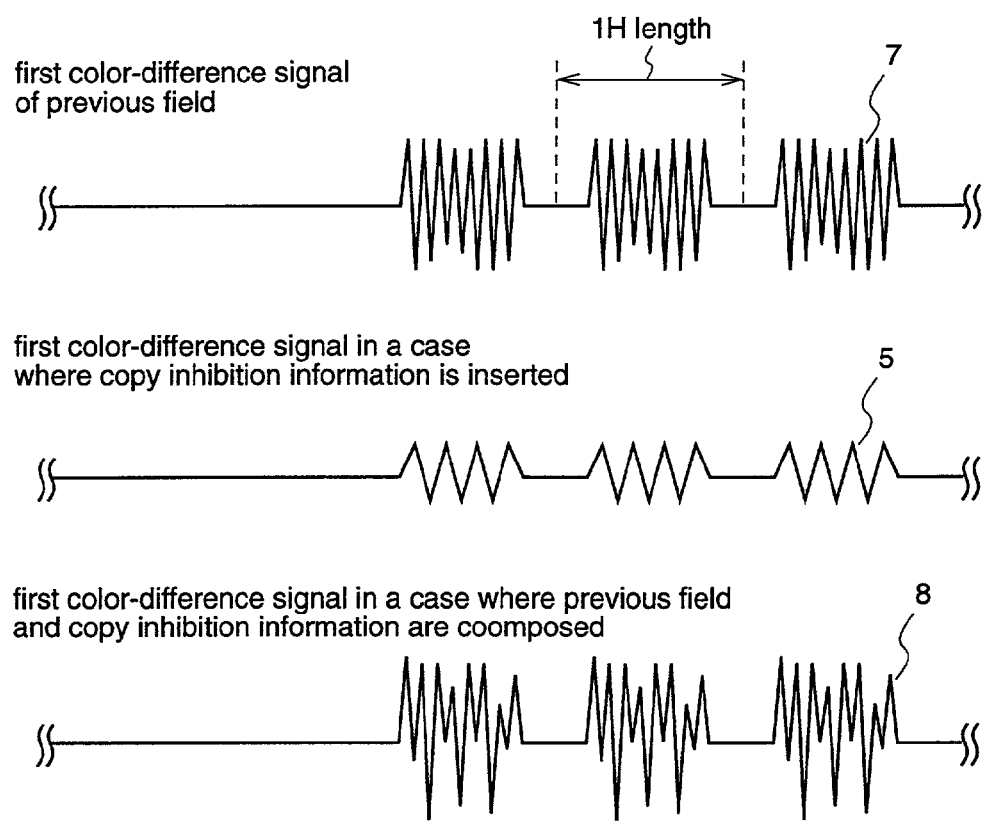
FIG. 3 is a waveform diagram showing a first color-difference signal according to a second embodiment.

FIG. 3 shows a waveform diagram of a first color-difference signal according to the second embodiment. In FIG. 3, numeral 7 denotes a first color-difference signal of a previous field. Numeral 8 denotes a signal which is obtained by composing the first color-difference signal of the previous field and copy inhibition information 5.

Figure 4:
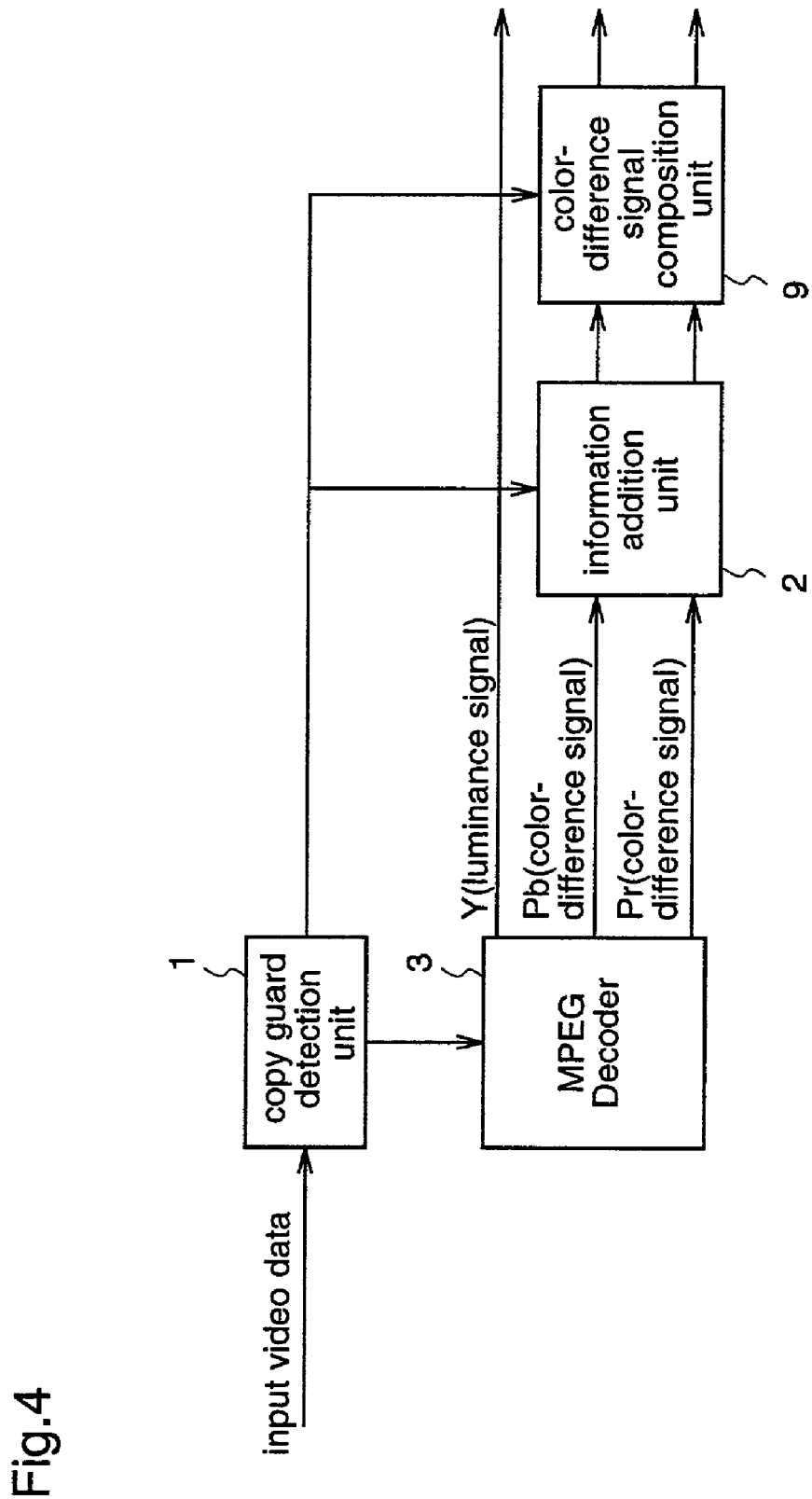
FIG. 4 is a diagram illustrating a structure of a digital broadcast receiver for outputting a copy-protected component video signal according to the second embodiment.

FIG. 4 is a block diagram illustrating a digital broadcast receiver according to the second embodiment. In FIG. 4, numeral 9 denotes a color-difference signal composition unit for holding a first color-difference signal 7 of a previous field of the first color-difference signal upon which copy inhibition information 5 has been superimposed by the information addition unit 2, and composing the signal 7 and the first color-difference signal upon which the copy inhibition information 5 has been superimposed. Other components are the same as those in the digital broadcast receiver of the first embodiment.

Initially, the copy protection method of the second embodiment will be described with reference to FIG. 3.

In the first embodiment, the copy inhibition information 5 is superimposed by removing the color-difference signal of actual video. However, in the first embodiment, since the color-difference signal is removed, the viewers may recognize that the copy inhibition information is superimposed upon the color-difference signal. In this second embodiment, as shown in FIG. 3, the first color-difference signal upon which the copy inhibition information 5 outputted from the information addition unit 2 has been superimposed and the first color-difference signal 7 of the immediately preceding field are composed by the color-difference signal composition unit 9, thereby creating the first color-difference signal 8 in which the first color-difference signal of the previous field and the copy inhibition information 5 are composed. Accordingly, even when a component video signal which has been subjected to the above-mentioned copy protection is outputted on the TV side as it is, it is possible to further prevent the viewers from recognizing that the copy inhibition information 5 is superimposed upon the color-difference signal of the video signal.

In addition, on the side of a recorder which records the component video signal, when the first color-difference signal 8 is analyzed, only the copy inhibition information 5 is extracted from the first color-difference signal 8 as a composite signal by using the first color-difference signal 7 of the previous field. Since the signal is composed using the first color-difference signal 7 of the previous field, this extraction of the copy inhibition information 5 can be easily performed.

Next, the operation of the digital broadcast receiver for outputting a copy-protected video signal according to the second embodiment will be described with reference to FIG. 4.

Initially, when the copy guard detection unit 1 detects that input video data is copy inhibited, the copy guard detection unit 1 transmits a signal for copy protection to the information addition unit 2 and the color-difference signal composition unit 9. Then, the information addition unit 2 superimposes the copy inhibition information 5 upon the first color-difference signal outputted from the MPEG decoder 3, superimposes the copy inhibition information superimposition indication signal 6 indicating that the copy inhibition information 5 is superimposed upon the first color-difference signal, upon the second color-difference signal, and thereafter transmits these color-difference signals to the color-difference signal composition unit 9. The color-difference signal composition unit 9 holds the first color-difference signal 7 of the previous field and, when it receives the signal for copy protection from the copy guard detection unit 1, composes the first color-difference signal including the copy inhibition information 5 and the held first color-difference signal 7 of the previous field.

The composition of the first color-difference signal 8 in the color-difference signal composition unit 9 may be performed in field units or in line units. For example, when the copy inhibition information 5 is inserted into the first color-difference signal in line units, a first color-difference signal of a previous line is held and composed. Since the composition of the first color-difference signal 8 in line units and the extraction of the copy inhibition information 5 from the signal 8 is performed using the first color-difference signal of the previous line, it can be easily performed.

Here, the first color-difference signal of a previous field or a previous line is composed only with the first color-difference signal upon which the copy inhibition information 5 has been superimposed. However, it is more effective when the color-difference signal of a previous field or a previous line is composed also with the second color-difference signal upon which the copy inhibition information superimposition indication signal 6 is superimposed, like in the case of the first color-difference signal.

As described above, according to the copy protection method and the digital broadcast receiver of this second embodiment, upon the first color-difference signal, the composite signal 8 in which the copy inhibition information 5 and the first color-difference signal 7 of the immediately preceding field are composed is superimposed, whereby the viewers more hardly recognize that the copy inhibition information 5 is superimposed upon the color-difference signal. Further, the composed signal 8 is created by the composition of the color-difference signal 7 of the immediately preceding field, whereby the creation of the composed signal 8 or the extraction of the copy inhibition information 5 from the signal 8 can be easily performed.

Like in the first embodiment, the information to be superimposed upon the first color-difference signal can be information other than the copy inhibition information and further the signal to be superimposed upon the second color-difference signal can be a signal which indicates that information is superimposed upon the first color-difference signal.

[Embodiment 3]

A copy protection method and a digital broadcast receiver according to a third embodiment of the present invention will be described with reference to FIG. 5.

Figure 5:
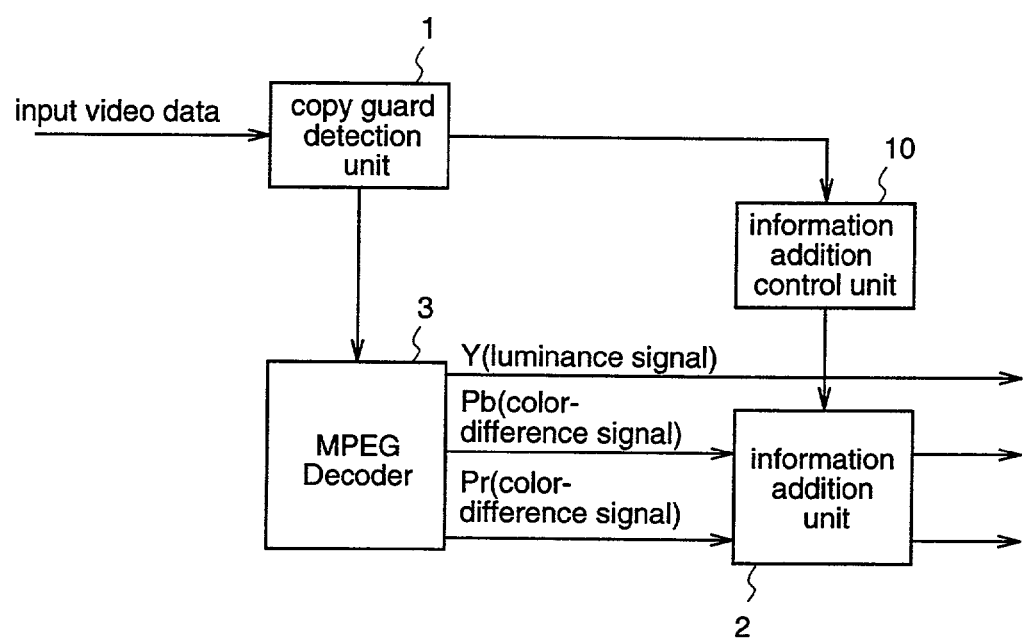
FIG. 5 is a diagram illustrating a structure of a digital broadcast receiver for outputting a copy-protected component video signal according to a third embodiment.

FIG. 5 is a block diagram illustrating a digital broadcast receiver according to the third embodiment. In FIG. 5, numeral 10 denotes an information addition control unit for controlling a cycle in which a copy protection process is carried out. Other components are the same as those in the digital broadcast receiver according to the first embodiment.

Initially, the copy protection method of the third embodiment is described.

When the copy inhibition information 5 is superimposed upon the first color-difference signal and the copy inhibition information superimposition indication signal 6 indicating that the copy inhibition information is superimposed upon the first color-difference signal is superimposed upon the second color-difference signal at regular intervals as described above, it is easier to be recognized by the viewers. Accordingly, in this third embodiment, these signals are superimposed at irregular intervals. When these signals are superimposed irregularly, it is possible to further prevent the viewers from recognizing that these signals are superimposed as compared to the case where these signals are superimposed at regular intervals.

Next, the operation of the digital broadcast receiver for outputting copy-protected video signals according to the third embodiment will be described with reference to FIG. 5.

Initially, when the copy guard detection unit 1 detects that input video data is copy inhibited, the copy guard detection unit 1 transmits a signal to the information addition control unit 10 so as to copy protect a component video signal which is outputted from the MPEG decoder 3. When the information addition control unit 10 receives this signal, it transmits the signal for copy protection to the information addition unit 2 at irregular intervals. The information addition unit 2 carries out a copy protection process for a color-difference signal which is outputted from the MPEG decoder 3, at a timing when it receives the signal for the copy protection. Thereby, the above-mentioned copy protection process can be superimposed upon the color-difference signal irregularly.

In a case where the information addition control unit 10 is added to the digital broadcast receiver as described in the second embodiment, when the information addition control unit 10 receives the signal for the copy protection from the copy guard detection unit 1, it transmits the signal to the information addition unit 2 and the color-difference signal composition unit 9 at irregular intervals. Then, in the information addition unit 2 and the color-difference signal composition unit 9, the above-mentioned copy protection process is carried out for the color-difference signal at irregular intervals.

As described above, according to the copy protection method and the digital broadcast receiver of this third embodiment, the copy inhibition information 5 is superimposed upon the color-difference signal at irregular intervals, whereby it becomes harder for the viewer to recognize that the information is superimposed, as compared to the first and second embodiments. Like in the first and second embodiment, the information to be superimposed upon the first color-difference signal can be information other than the copy inhibition information and further the signal to be superimposed upon the second color-difference signal can be a signal indicating that information is superimposed upon the first color-difference signal.

[Embodiment 4]

A copy protection method and a digital broadcast receiver according to a fourth embodiment of the present invention will be described with reference to FIGS. 6 and 7.

Figure 6:
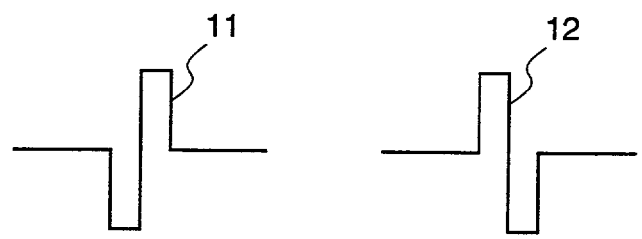
FIG. 6 is a waveform diagram showing a normal ternary signal and an inverted ternary signal.

FIG. 6 is a diagram showing a normal ternary signal and an inverted ternary signal. Numeral 11 denotes a normal ternary signal and numeral 12 denotes an inverted ternary signal.

Figure 7:
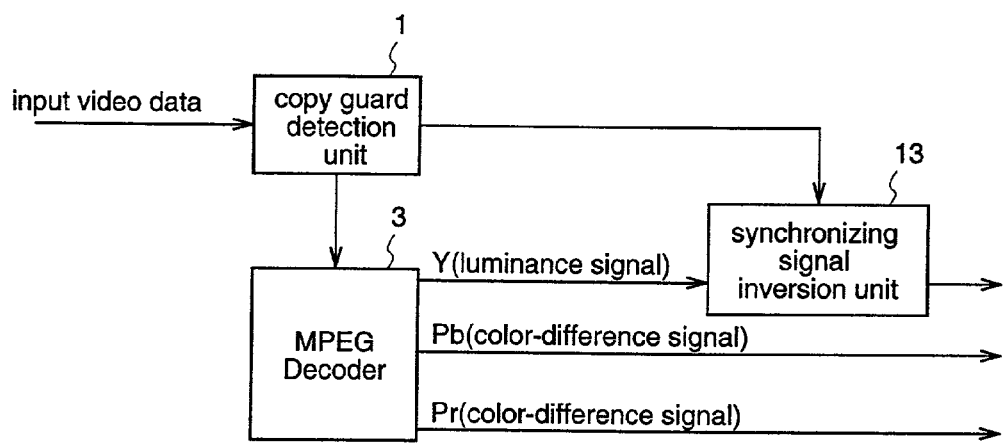
FIG. 7 is a diagram illustrating a structure of a digital broadcast receiver for outputting a copy-protected component video signal according to a fourth embodiment.

FIG. 7 is a block diagram illustrating a digital broadcast receiver according to the fourth embodiment. In FIG. 7, numeral 1 denotes a copy guard detection unit. Numeral 3 denotes an MPEG decoder. Numeral 13 denotes a synchronizing signal inversion unit for outputting a luminance signal having an inverted synchronizing signal.

Initially, the copy protection method according to the fourth embodiment is described with reference to FIG. 6.

When a component video signal is outputted, a ternary signal 11 is usually used as a synchronizing signal included in the luminance signal of the component video signal. In the copy protection method according to this fourth embodiment, this synchronizing signal as the ternary signal is inverted and when the inverted synchronizing signal 12 is detected on the recorder side, recording of the component video signal is not performed but the copy inhibition process is carried out, thereby preventing unauthorized copying.

Further, in the case where the above-mentioned copy-protected component video signal is outputted as it is on the TV side, when the synchronizing signal 12 as the inverted ternary signal is detected, this synchronizing signal 12 is inverted again to restore the signal to the original normal ternary signal, and then the normal ternary signal is outputted. Accordingly, it becomes possible to prevent the viewer from recognizing that the video signal is copy protected.

Next, the operation of the digital broadcast receiver for outputting copy-protected video signals according to the fourth embodiment will be described with reference to FIG. 7.

Initially, when the copy guard detection unit 1 detects that input video data is copy inhibited, the copy guard detection unit 1 transmits a signal to the synchronizing signal inversion unit 13 so as to invert a synchronizing signal. When the synchronizing signal inversion unit 13 receives this signal, it inverts the synchronizing signal included in a luminance signal which is outputted from the MPEG decoder 3, and outputs a luminance signal including an inverted synchronizing signal 12 as shown in FIG. 6.

As described above, according to the copy protection method and the digital broadcast receiver of this fourth embodiment, no copy inhibition information is superimposed upon the color-difference signal and the luminance information themselves. Therefore, the copy protection process can be carried out without being recognized by the viewers at all on the display screen.

[Embodiment 5]

A copy protection method and a digital broadcast receiver according to a fifth embodiment of the present invention will be described with reference to FIGS. 8 and 9.

Figure 8:
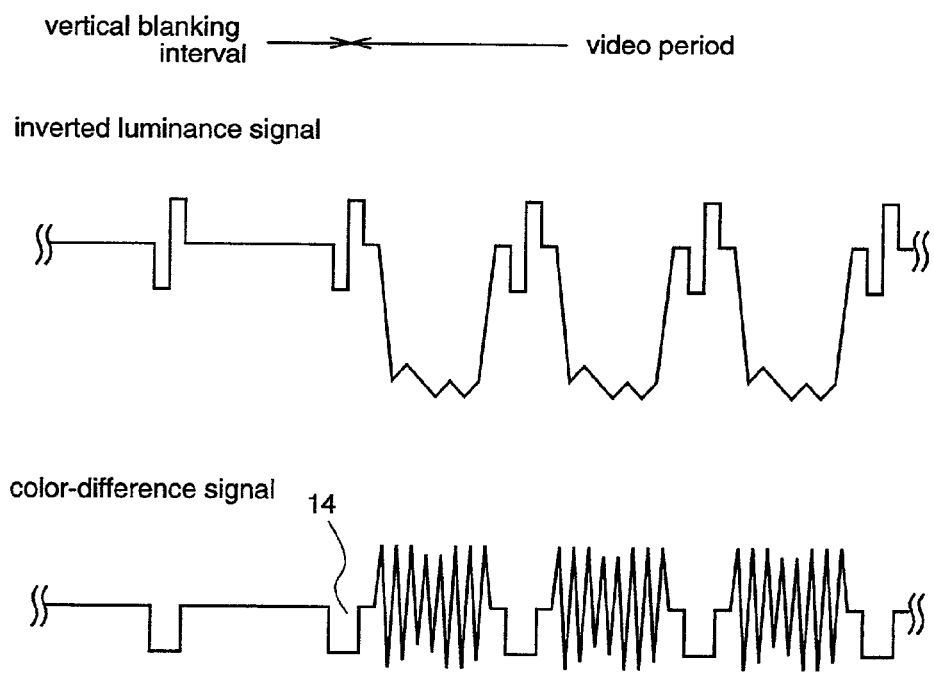
FIG. 8 is a waveform diagram showing a luminance signal and a color-difference signal which are copy protected according to a fifth embodiment.

FIG. 8 is a waveform diagram showing a luminance signal and a color-difference signal which are copy protected according to the fifth embodiment. In FIG. 8, numeral 14 denotes a luminance signal inversion indication signal which indicates that a luminance signal is inverted.

Figure 9:
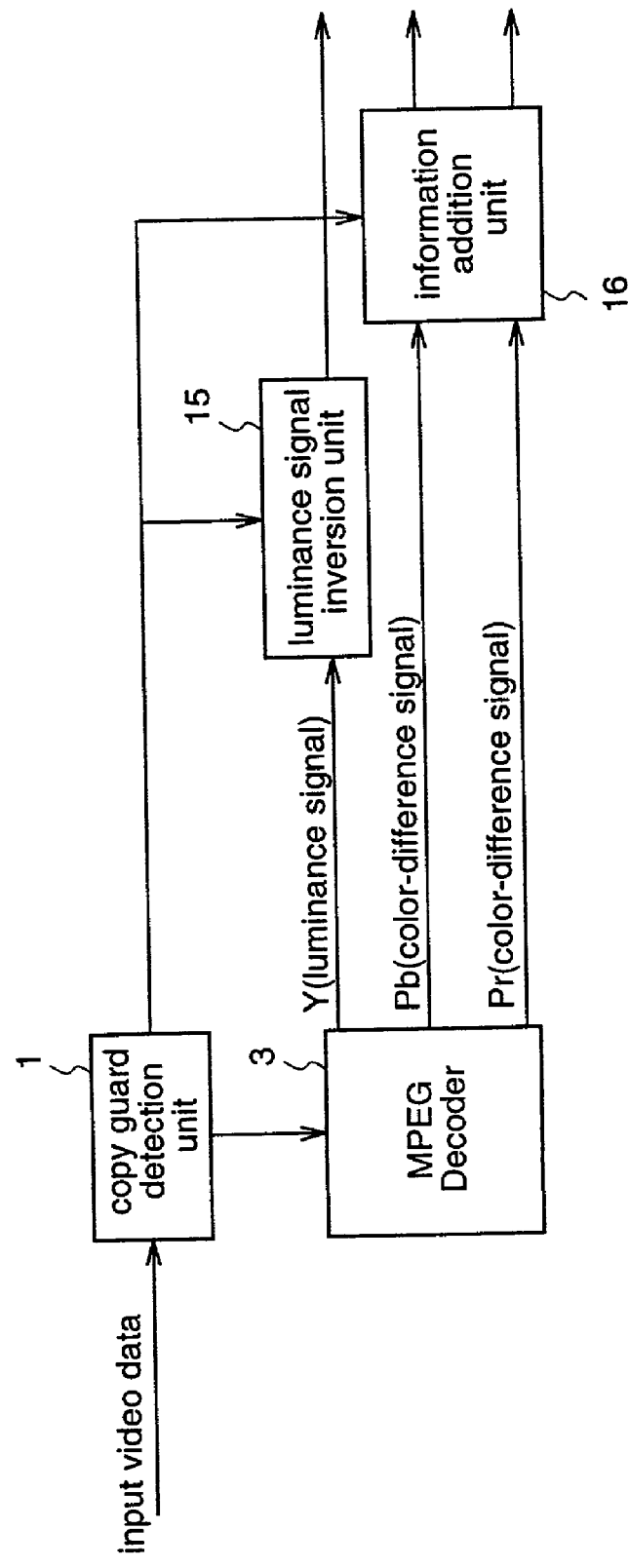
FIG. 9 is a diagram illustrating a structure of a digital broadcast receiver for outputting a copy-protected component video signal according to the fifth embodiment.

FIG. 9 is a block diagram illustrating a digital broadcast receiver according to the fifth embodiment. In FIG. 9, numeral 1 denotes a copy guard detection unit. Numeral 3 denotes an MPEG decoder. Numeral 15 denotes a luminance signal inversion unit for inverting a luminance signal. Numeral 16 denotes an information addition unit for superimposing a luminance signal inversion indication signal which indicates that a luminance signal is inverted, upon a vertical blanking interval or a horizontal blanking interval of one or both of color-difference signals.

Initially, the copy protection method according to the fifth embodiment will be described with reference to FIG. 8.

In the fourth embodiment, the synchronizing signal included in the luminance signal is inverted, thereby copy protecting the video data. However, in this fifth embodiment, as shown in FIG. 8, the luminance signal is inverted and simultaneously a luminance signal inversion indication signal 14 indicating that the luminance signal is inverted is superimposed upon a horizontal blanking interval of one or both of color-difference signals. For example, as shown in FIG. 8, the luminance signal inversion indication signal 14 is inserted in the horizontal blanking interval of the color-difference signal in synchronization with the synchronizing signal included in the luminance signal.

On the recorder side, when the luminance signal inversion indication signal 14 indicating that the luminance signal is inverted is detected in the horizontal blanking interval of the color-difference signal, the luminance signal inversion indication signal 14 is deleted, and the component video signal including the inverted luminance signal is recorded as it is or subjected to the copy inhibition process, thereby preventing unauthorized copying. When this copy-protected video signal is recorded and reproduced, since the luminance signal inversion indication signal 14 is deleted, the video signal is outputted with the luminance signal being inverted on the display screen.

Further, in the case where the above-mentioned copy-protected component video signal is outputted on the TV side, when the luminance signal inversion indication signal 14 indicating that the luminance signal is inverted is detected in the horizontal blanking interval of the color-difference signal, the luminance signal is inverted to be restored, and thereafter this restored signal is outputted. Thereby, it becomes possible to prevent the viewers from recognizing that the video signal is copy protected.

Further, the synchronizing signal may be also inverted when the luminance signal is inverted. In this case, when the video signal is outputted on the TV side, the synchronizing signal is also inverted to be restored, together with the luminance signal.

Here, the luminance signal inversion indication signal 14 indicating that the luminance signal is inverted is inserted in the horizontal blanking interval of the color-difference signal, while this signal may be inserted in the vertical blanking interval.

Next, the operation of the digital broadcast receiver for outputting copy-protected video signals according to the fifth embodiment will be described with reference to FIG. 9.

Initially, when the copy guard detection unit 1 detects that input video data is copy inhibited, the copy guard detection unit 1 transmits a signal for copy protection to the luminance signal inversion unit 15 and the information addition unit 16. When receiving this signal, the luminance signal inversion unit 15 inverts the luminance signal, and the information addition unit 16 superimposes the luminance signal inversion indication signal 14 indicating that the luminance signal is inverted, upon the vertical blanking interval or the horizontal blanking interval of one or both of the color-difference signals.

As described above, according to the copy protection method and the digital broadcast receiver of the fifth embodiment, when the component video signal to be recorded is copy inhibited, the luminance signal is inverted and the luminance signal inversion indication signal 14 indicating that the luminance signal is inverted is superimposed upon one of the color-difference signals. Therefore, at the normal screen display, when the luminance signal inversion indication signal 14 is detected, the inverted luminance signal is restored and then outputted, whereby the video signal can be displayed on the screen without being recognized by the viewers at all that the copy inhibition information is superimposed. On the other hand, when copied video is reproduced, video having inverted luminance is displayed on the screen, whereby it can be judged to be copied video.

[Embodiment 6]

A copy protection method and a digital broadcast receiver according to a sixth embodiment of the present invention will be described with reference to FIGS. 10, 11, 12, 13 and 14.

Figure 10:
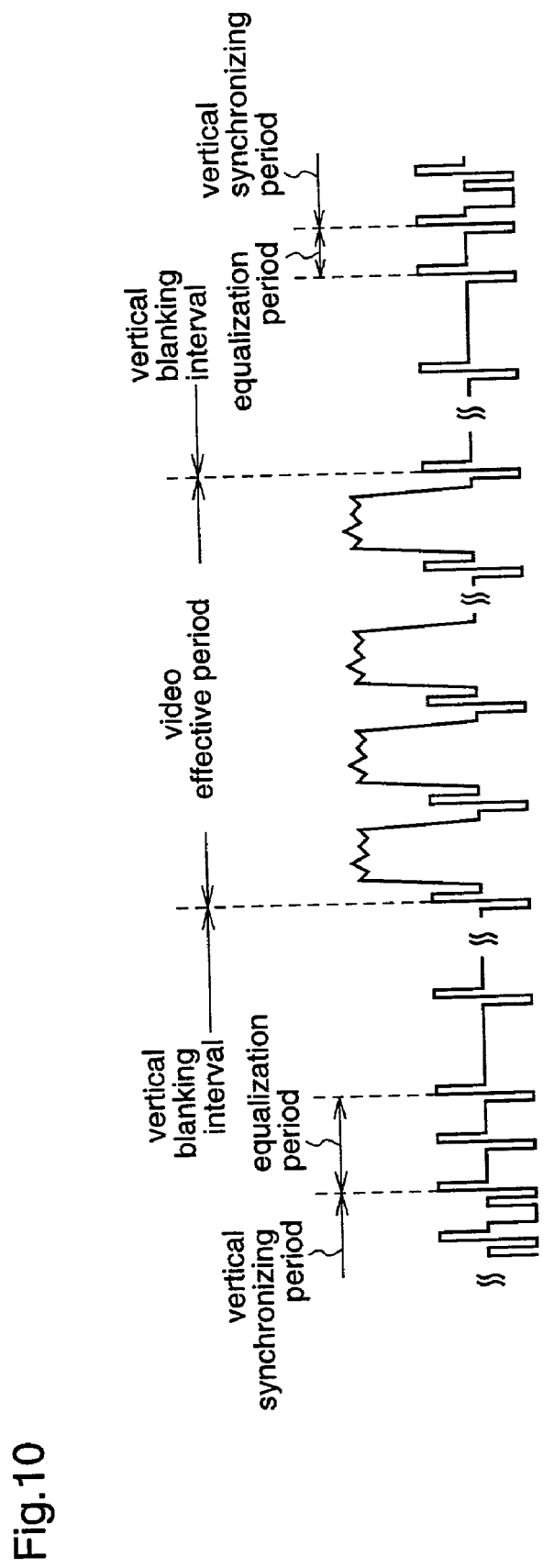
FIG. 10 is a waveform diagram showing a luminance signal including vertical blanking intervals.
Figure 11:
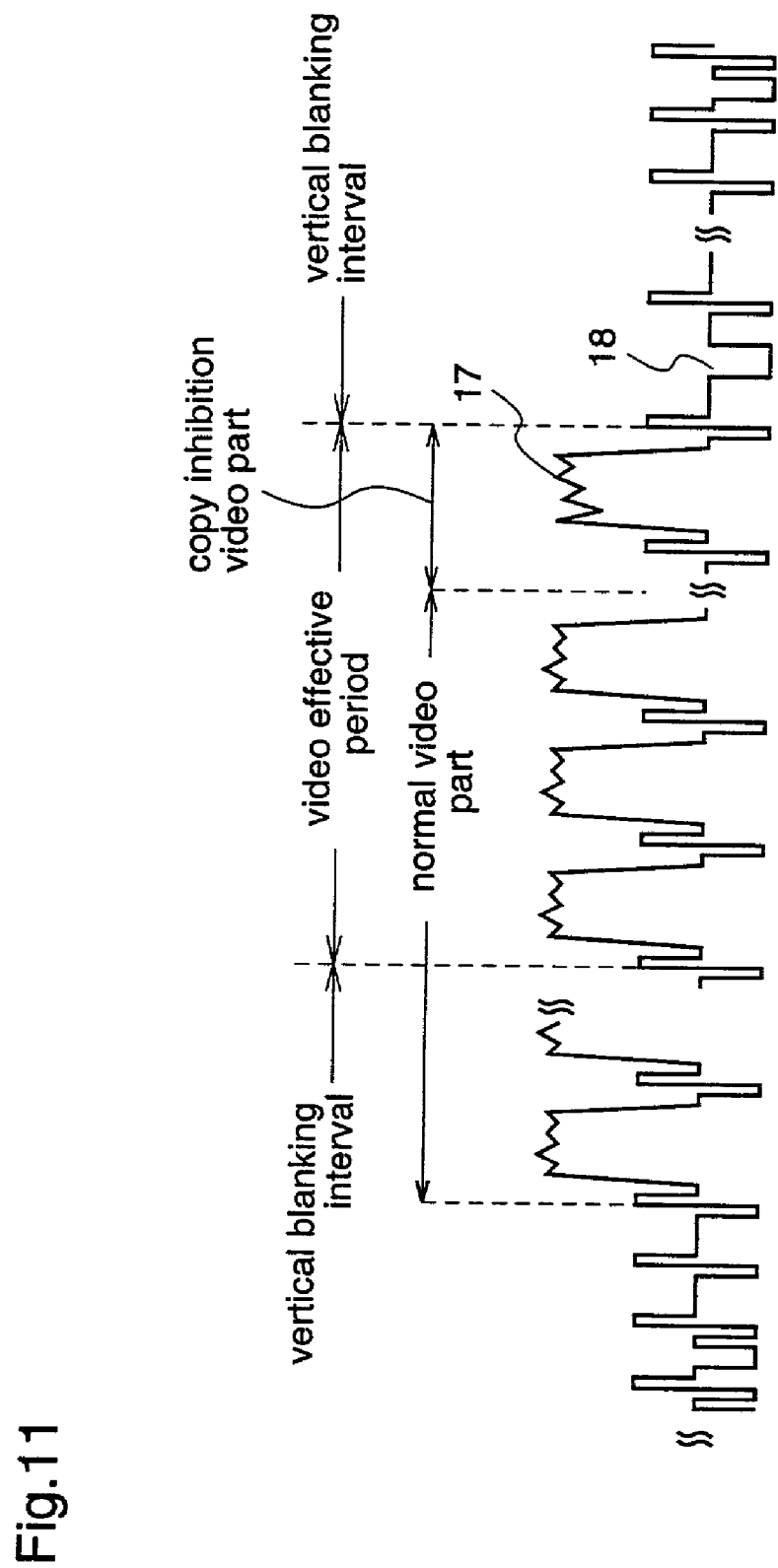
FIG. 11 is a waveform diagram showing a luminance signal which is copy protected in field units according to a sixth embodiment.
Figure 12:
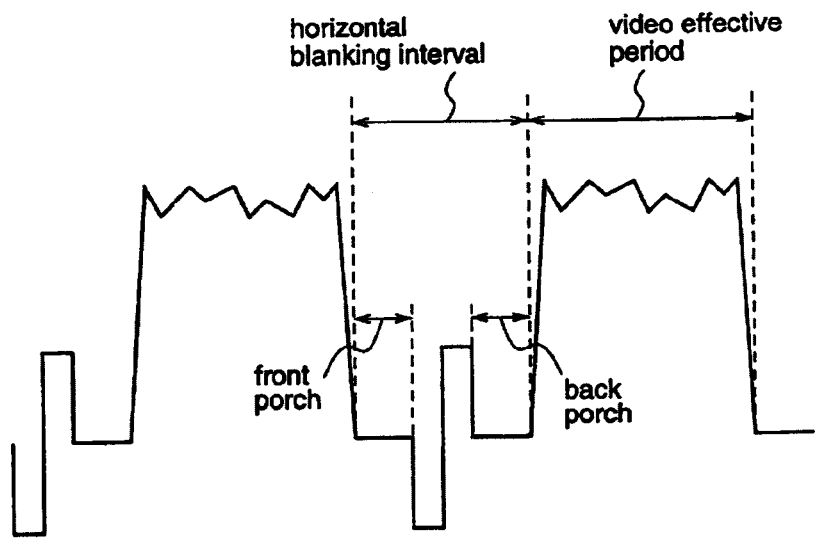
FIG. 12 is a waveform diagram showing a luminance signal including horizontal blanking intervals.
Figure 13:
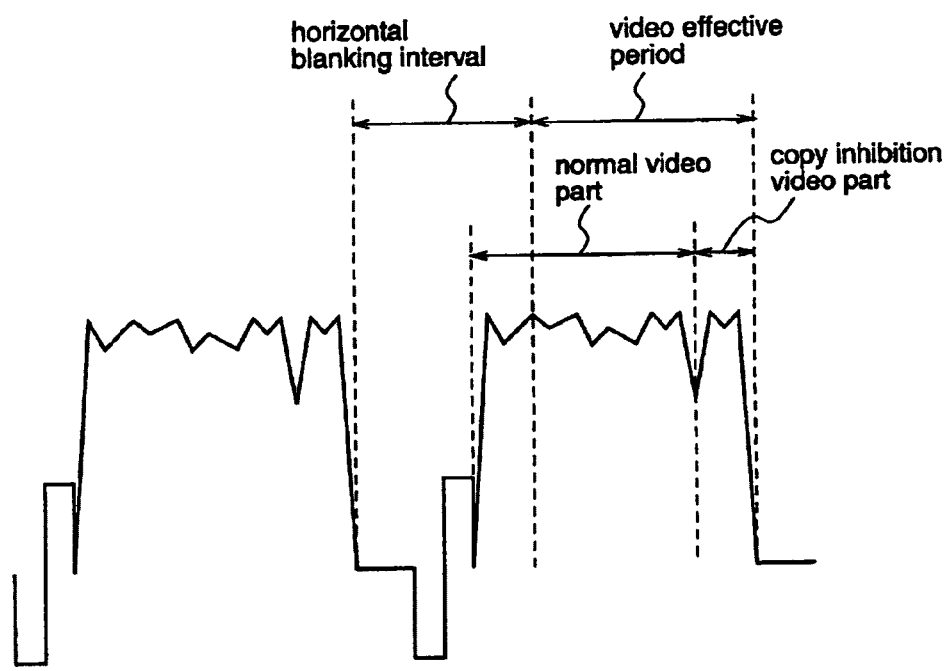
FIG. 13 is a waveform diagram showing a luminance signal which is copy protected in line units according to the sixth embodiment.

FIG. 10 shows a luminance signal including a vertical blanking interval. FIG. 11 shows a luminance signal which is copy protected in field units according to the sixth embodiment. In addition, FIG. 12 shows a luminance signal including a horizontal blanking interval. FIG. 13 shows a luminance signal which is copy protected in line units according to the sixth embodiment.

In FIG. 11, numeral 17 denotes a copy inhibition video. Numeral 18 denotes a copy inhibition video superimposition indication signal which indicates that the copy inhibition video 17 is superimposed.

Figure 14:
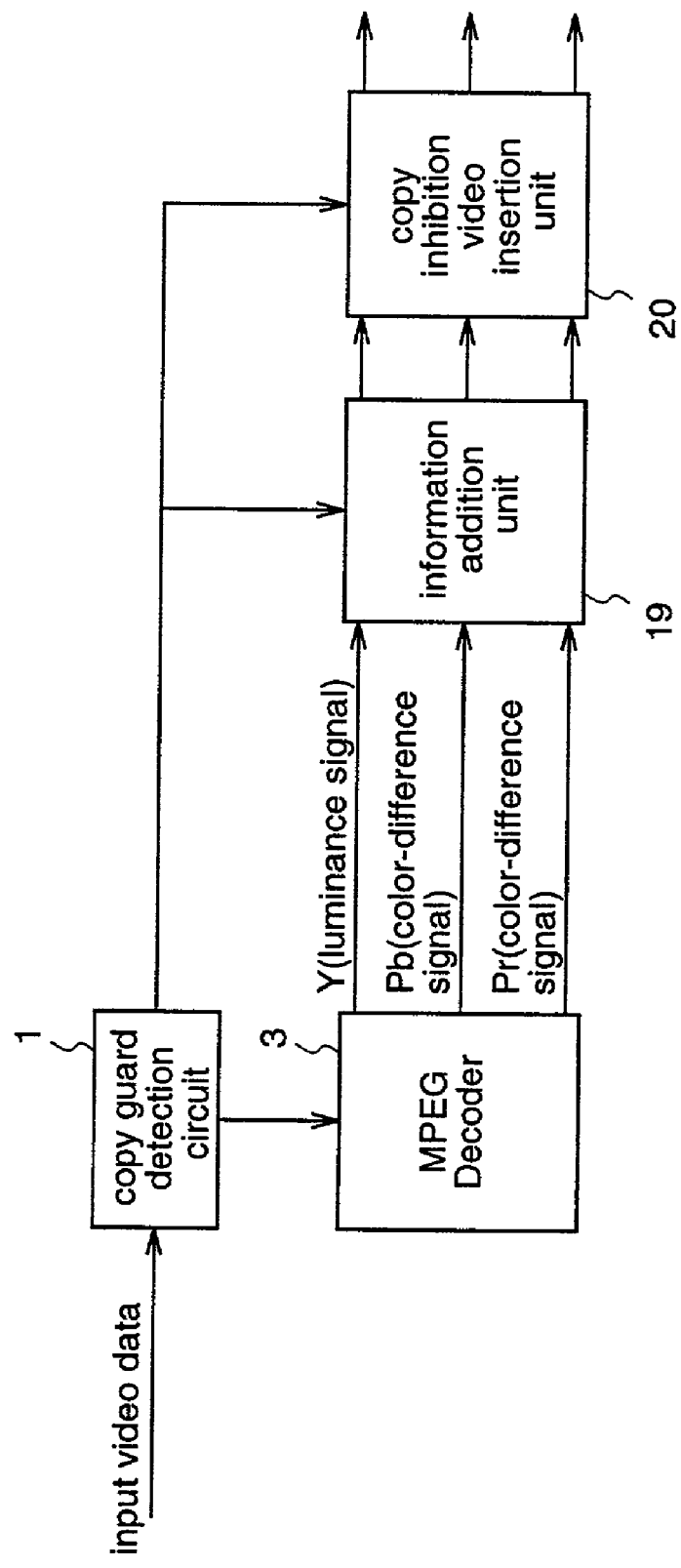
FIG. 14 is a diagram illustrating a structure of a digital broadcast receiver for outputting a copy-protected component video signal according to the sixth embodiment.
Figure 15:
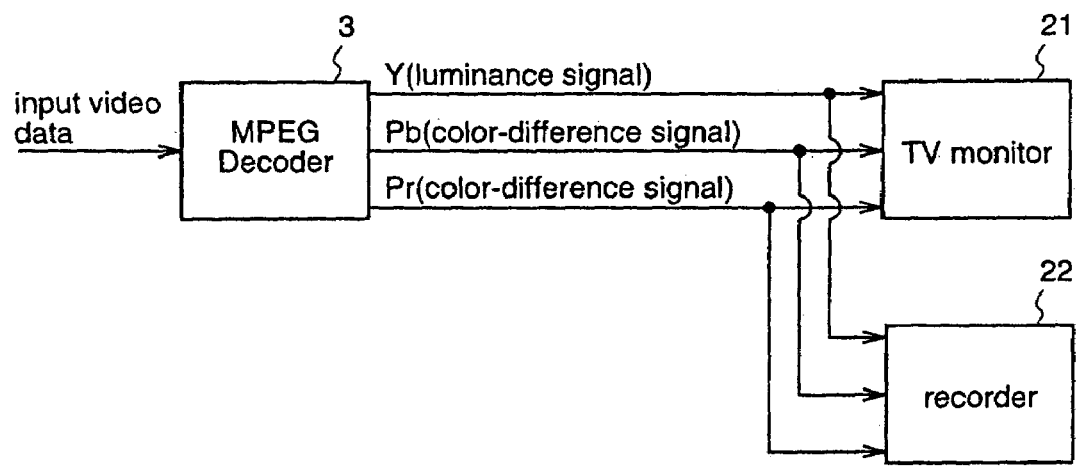
FIG. 15 is an output diagram showing a conventional component video signal.

In FIG. 14, numeral 1 denotes a copy guard detection circuit. Numeral 3 denotes an MPEG decoder. Numeral 19 denotes an information addition unit for superimposing the copy inhibition video superimposition indication signal 18 indicating that the copy inhibition video 17 is superimposed, upon a luminance signal or one or both of color-difference signals. Numeral 20 denotes a copy inhibition video insertion unit for inserting the copy inhibition video into the luminance signal and the color-difference signal.

Initially, the copy protection method according to the sixth embodiment will be described with reference to FIGS. 10, 11, 12 and 13.

A video signal includes a vertical blanking interval and a horizontal blanking interval and these parts are not displayed on the display screen.

As shown in FIG. 10, since the vertical blanking interval usually includes no data, video data can be delayed or advanced by a period immediately after the end of an equalization period until video starts or a period after video ends until an equalization period starts. Therefore, the copy inhibition video 17 of this period can be superimposed upon the luminance signal. Then, as shown in FIG. 11, the copy inhibition video 17 is superimposed upon a start part or an end part of a video effective period of a field of the luminance signal, and the start position of normal video data is delayed or advanced toward the end part or the start part of the field by the superimposed copy inhibition video 17. When this copy inhibition video 17 is superimposed, the copy inhibition video superimposition indication signal 18 indicating that the copy inhibition video 17 is superimposed upon the start part or the end part of the video effective period of the field is simultaneously superimposed upon the vertical blanking interval of the luminance signal or one or both of the color-difference signal. For example, as shown in FIG. 11, the copy inhibition video superimposition indication signal 18 is inserted in the vertical blanking interval of the luminance signal.

On the recorder side, when the copy inhibition video superimposition indication signal 18 indicating that the copy inhibition video 17 is superimposed upon the start part or the end part of the video effective period of the field is detected, the video signal is recorded with deleting the copy inhibition video superimposition indication signal 18 or the copy inhibition process is carried out, thereby preventing unauthorized copying. When the video signal which has been subjected to the copy protection is recorded and reproduced, since the copy inhibition video superimposition indication signal 18 indicating that the copy inhibition video 17 is inserted into the start part or the end part of the video effective period of the field is deleted, the copy inhibition video 17 is displayed on the TV side on the upper part or the lower part of the display screen.

Further, in the case where the component video signal which has been subjected to the above-mentioned copy protection is outputted on the TV side, when the copy inhibition video superimposed indication signal 18 indicating that the copy inhibition video 17 is superimposed is detected, the copy inhibition video 17 is deleted, and then the normal video part is restored to the video effective period of the field, thereby obtaining the signal as shown in FIG. 10. Accordingly, it is possible to prevent the viewers from recognizing that the video signal is copy protected.

In the above descriptions, the method for copy protecting a component video signal has been explained, by which the copy inhibition video 17 is superimposed upon a start part or an end part of a video effective period of a field of the luminance signal. However, as shown in FIG. 12, since the horizontal blanking interval also has parts including no video, i.e., a front porch and a back porch, the copy inhibition video 17 can be superimposed upon a start part or an end part of a line as shown in FIG. 13. In this case, the copy inhibition video 17 is superimposed thereupon by a period of a front porch or a back porch, and the copy inhibition video superimposition instruction signal 18 indicating that the copy inhibition video 17 is superimposed upon the start part or the end part of the video effective period of the line is superimposed upon the vertical blanking interval of the luminance signal or one or both of the color-difference signals. Thereby, unauthorized copying can be prevented as in the case where the copy inhibition video 17 is superimposed upon the start part or the end part of the video effective period of the field. When this copy-protected video signal is recorded and reproduced, the copy inhibition video 17 is displayed on the TV side on the left part or the right part of the display screen.

The copy inhibition video superimposition indication signal 18 may be inserted in the horizontal blanking interval, not in the vertical blanking interval.

Next, the digital broadcast receiver for outputting copy-protected video signals according to the sixth embodiment will be described with reference to FIG. 14.

Initially, when the copy guard detection unit 1 detects that input video data is copy inhibited, the copy guard detection unit 1 transmits a signal for copy protection to the information addition unit 19 and the copy inhibition video insertion unit 20. When receiving this signal, the information addition unit 19 superimposes the copy inhibition video superimposition indication signal 18 indicating that the copy inhibition video 17 is superimposed, upon the vertical blanking interval or the horizontal blanking interval of the luminance signal or one or both of the color-difference signals, and the copy inhibition video insertion unit 20 carried out a process for inserting the copy inhibition video 17 in the luminance signal and the color-difference signal as described above.

As described above, according to the copy protection method and the digital broadcast receiver of the sixth embodiment, the copy inhibition video 17 is superimposed upon a start part or an end part of a video effective period of a field, or a start part or an end part of a video effective period of a line of the luminance signal, and further the copy inhibition video superimposition indication signal 18 indicating that the copy inhibition video 17 is superimposed is superimposed upon the vertical blanking interval of the luminance signal. Therefore, at the normal screen display, the copy inhibition video superimposition indication signal 18 is detected, then the copy inhibition video 17 is deleted from the luminance signal to restore this signal to the normal video signal, and the normal video signal is outputted, whereby the screen display can be performed without being recognized by the viewers at all that the copy inhibition information is superimposed thereupon. On the other hand, when copied video is reproduced and displayed, the video is recorded without deleting the copy inhibition video 17 from the luminance signal and, when the copied video is displayed on TV or the like, the copy inhibition video 17 is displayed in any of upper and lower parts and right and left parts of the display screen, whereby it can be judged to be copied video.

INDUSTRIAL AVAILABILITY

The copy protection method and the digital broadcast receiver according to the present invention are greatly useful in carrying out the optimum copy protection process for a component video signal which is composed of a luminance signal and two color-difference signals.

The invention claimed is:

1. A copy protection method for a component video signal which is composed of a luminance signal and two color-difference signals, comprising steps of:
   on a digital broadcast receiver side, superimposing copy inhibition information upon a first one of the two color-difference signals and superimposing, upon a second one of the color-difference signals, a copy inhibition information superimposition indication signal indicating that the copy inhibition information is superimposed upon the first color-difference signal; and
   on a recorder side, when the copy inhibition information superimposition indication signal is detected in the second color-difference signal, analyzing the first color-difference signal and, when the copy inhibition information is detected in the first color-difference signal, carrying out a copy inhibition process without performing recording.

2. A digital broadcast receiver comprising:
   a copy guard detection unit for detecting whether input video data is copy inhibited or not; and
   an information addition unit for superimposing copy inhibition information upon a first one of two color-difference signals when the copy guard detection unit detects that the input video data is copy inhibited and superimposing, upon a second one of the color-difference signals, a copy inhibition information superimposition indication signal indicating that the copy inhibition information is superimposed upon the first color-difference signal.

3. The copy protection method of claim 1 wherein
   the copy inhibition information is superimposed upon the first color-difference signal and the copy inhibition information superimposition indication signal is superimposed upon the second color-difference signal in field units or in line units.

4. The digital broadcast receiver of claim 2 wherein
   when the copy inhibition information is superimposed upon the first color-difference signal and the copy inhibition information superimposition indication signal is superimposed upon the second color-difference signal, the information addition unit performs the superimposition in field units or in line units.

5. The copy protection method of claim 1 wherein
   after the copy inhibition information is superimposed upon the first color-difference signal and the copy inhibition information superimposition indication signal is superimposed upon the second color-difference signal, in field units,
   the superimposed color-difference signal of each field and a color-difference signal of an immediately preceding field are composed.

6. The digital broadcast receiver of claim 2 comprising:
   a color-difference signal composition unit for, after the copy inhibition information is superimposed upon the first color-difference signal and the copy inhibition information superimposition indication signal is superimposed upon the second color-difference signal, in field units, composing the superimposed color-difference signal of a field and a color-difference signal of an immediately preceding field.

7. The copy protection method of claim 1 wherein
   after the copy inhibition information is superimposed upon the first color-difference signal and the copy inhibition information superimposition indication signal is superimposed upon the second color-difference signal, in line units,
   the superimposed color-difference signal of each line and a color-difference signal of an immediately preceding line are composed.

8. The digital broadcast receiver of claim 2 comprising:
   a color-difference signal composition unit for, after the copy inhibition information is superimposed upon the first color-difference signal and the copy inhibition information superimposition indication signal is superimposed upon the second color-difference signal, in line units, composing the superimposed color-difference signal of a line and a color-difference signal of an immediately preceding line.

9. The copy protection method of claim 1 wherein
   when the copy inhibition information is superimposed upon the first color-difference signal and the copy inhibition information superimposition indication signal is superimposed upon the second color-difference signal, they are superimposed at irregular intervals.

10. The digital broadcast receiver of claim 2 comprising:
    an additional signal control unit for, when the copy inhibition information is superimposed upon the first color-difference signal and the copy inhibition information superimposition indication signal is superimposed upon the second color-difference signal, performing control for superimposing the same at irregular intervals.

11. The copy protection method of claim 3 wherein
    when the copy inhibition information is superimposed upon the first color-difference signal and the copy inhibition information superimposition indication signal is superimposed upon the second color-difference signal, they are superimposed at irregular intervals.

12. The copy protection method of claim 5 wherein
    when the copy inhibition information is superimposed upon the first color-difference signal and the copy inhibition information superimposition indication signal is superimposed upon the second color-difference signal, they are superimposed at irregular intervals.

13. The copy protection method of claim 7 wherein
    when the copy inhibition information is superimposed upon the first color-difference signal and the copy inhibition information superimposition indication signal is superimposed upon the second color-difference signal, they are superimposed at irregular intervals.

14. The digital broadcast receiver of claim 4 comprising;
    an additional signal control unit for, when the copy inhibition information is superimposed upon the first color-difference signal and the copy inhibition information superimposition indication signal is superimposed upon the second color-difference signal, performing control for superimposing the same at irregular intervals.

15. The digital broadcast receiver of claim 6 comprising:
    an additional signal control unit for, when the copy inhibition information is superimposed upon the first color-difference signal and the copy inhibition information superimposition indication signal is superimposed upon the second color-difference signal, performing control for superimposing the same at irregular intervals.

16. The digital broadcast receiver of claim 8 comprising:
an additional signal control unit for, when the copy inhibition information is superimposed upon the first color-difference signal and the copy inhibition information superimposition indication signal is superimposed upon the second color-difference signal, performing control for superimposing the same at irregular intervals.

\* \* \* \* \*